United States Patent Office 2,957,868
Patented Oct. 25, 1960

2,957,868
Δ¹⁸-ETIO CHOLENIC ACID ESTERS

Albert Wettstein, Georg Anner, and Karl Heusler, Basel, Helmut Ueberwasser, Riehen, and Peter Wieland, Julius Schmidlin, and Jean-Rene Billeter, Basel, Switzerland, assignors to Ciba Pharmaceutical Products Inc., Summit, N.J., a corporation of New Jersey No Drawing. Filed July 9, 1958, Ser. No. 747,346

Claims priority, application Switzerland July 30, 1954

9 Claims. (Cl. 260—239.55)

This application relates to a process for the synthesis of steroids and is a continuation in part of our copending application Serial No. 521,398, filed July 11, 1955.

In said application Serial No. 521,398 a process is described for the manufacture of 16-oxo-steroids by attachment of a 5-membered ring to 4β-hydroxy-polyhydrophenanthrene-1-ones. The 16-oxo-steroids obtained according to that process contain a bridge consisting of two carbon atoms leading from the carbon atom 13 to the 11β-hydroxyl group.

The present invention is based on the observation that the 16-oxo-steroids prepared according to the said process especially those having a double bond proceeding from the carbon atom 18 are particularly suitable for the manufacture of 18-oxygenated steroids unsubstituted in 16-position and having a free or esterified carboxyl group in 17-position. The process for the manufacture of these compounds consists in that a compound of the formula

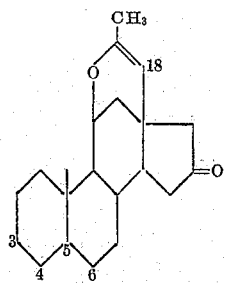

or a corresponding compound unsaturated in 4:5- or 5:6-position and/or in 14:15-position, containing in 3-position a hydrogen atom and a free or functionally converted hydroxyl group or alternatively a protected oxo group, for example a ketal, an enol ether or an enamine group is condensed with a carbonic acid ester in the presence of an alkaline condensing agent, the resulting β-keto-ester, if desired after hydrogenation of any 14:15-double bond present, converted into a 16-enol derivative, preferably an enol ester, in the latter the substituent in 16-position hydrogenalytically removed and at the same time the 16:17-double bond hydrogenated, in the resulting etio-acid ester the 18:18a-double bond oxidatively split and, if desired after oxidation of a 13-formyl to a carboxyl group, the 11β-acetoxy group formed hydrolysed and, if desired, resulting 17-carboxylic acids esterified.

For the specified condensation with carbonic acid esters there are used especially strongly alkaline condensing agents, such as alkali metal alcoholates, hydrides or amides; it is especially advantageous to use the complex formed by dissolving metallic sodium in carbonic acid alkyl esters, for example diethyl carbonate. The hydrogenation of the 14:15-double bond takes place advantageously using a palladium catalyst on a carrier substance, for example charcoal, calcium carbonate, barium sulfate or zinc carbonate, in a more or less polar solvent such as methanol, ethanol or ethyl acetate. The conversion of the resulting β-keto ester into an enol derivative takes place extremely easily by methods known per se. The production of the enol esters takes place using acid anhydrides or acid halides, for example acetic anhydride, propionic acid anhydride or the corresponding acid chlorides, for example also with benzoyl chloride or sulfonic acid chlorides, for example methane sulfonyl chloride, especially in the presence of tertiary bases, for example pyridine.

For the hydrogenolysis of the enol derivative with simultaneous saturation of the 16:17-double bond the operation is conducted advantageously under neutral or weakly alkaline conditions, so that the enol ether grouping connecting the carbon atom 18 with the 11β-hydroxyl group remains unchanged. As catalysts are suitable noble metal catalysts, especially palladium, on carrier substances, such as calcium or strontium carbonate, charcoal or barium sulfate, or also Raney nickel catalysts. The latter are especially advantageous in the removal of sulfonic acid ester groups.

The splitting of the enol double bond in the enol ether grouping between the carbon atoms 18 and 11 takes place in the manner known per se for the oxidative splitting of double bonds. The ozonides obtained by the action of ozone can be split either reductively, for example with zinc and acetic acid, or oxidatively, whereby 11β-acyloxy-18-oxo- or 11β-acyloxy-13-carboxy compounds are produced. On the other hand it is also possible to hydroxylate the enol double bond in the manner known per se, for example by the action of molar quantities of osmium tetroxide, and to split the resulting glycols with periodic acid or lead tetraacetate or bismuthate. If desired, a 13-formyl group can, prior to the hydrolysis of the 11β-acetoxy group, be oxidized to the carboxyl group. The hydrolysis of the 11β-acetoxy group and the esterification of the 17-carboxyl group take place in the manner known per se.

One embodiment of the process is illustrated in the scheme of partial formulae

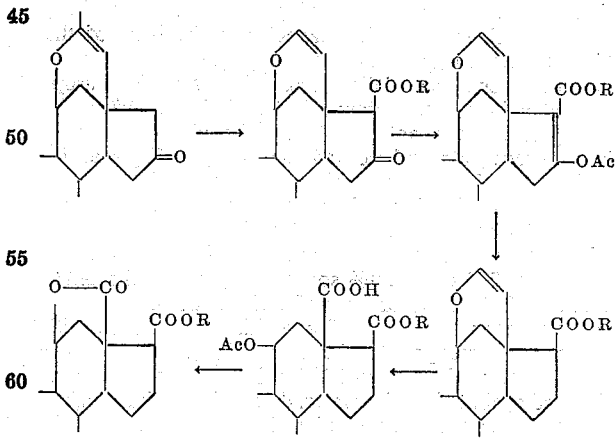

The resulting products are valuable intermediate products for the manufacture of the highly active adrenal cortex hormone aldosterone and derivatives thereof. This conversion is described in our copending application Serial No. 480,061, filed January 5, 1955. It is performed in the following manner: the etianic acids of the present invention or their derivatives unsaturated in the nucleus are converted by known methods into the acid halides, for instance by treating them with oxalyl chloride, after having suitably protected sensitive substituents, such as for instance free hydroxy or oxo groups. The acid halides are then reacted with diazomethane and the so obtained diazo-ketones are treated with a dilute aqueous organic or inorganic acid, whereby the 21-hydroxy-pregnane derivatives are obtained, or with a concentrated anhydrous organic acid, 21-hydroxy-pregnane-21-esters being obtained. If in the starting materials used there is present in 13-position a protected oxo group, this group can be liberated after having formed the pregnane side chain in 17-position, whereby aldosterone derivatives are obtained. In case of starting materials possessing a free or functionally converted carboxyl group in 13-position such as a carboxyl group lactonized with an 11-hydroxyl group, such group can be transformed into an aldehyde group by reduction with the calculated amount of lithium aluminum hydride.

The starting materials for the present process can contain in 3-position a free or an esterified hydroxyl group preferably a hydroxy group esterified with a lower alkanoic acid or a monocyclic aromatic acid having from 1 to 20 carbon atoms, e.g. an acetylated or benzoylated hydroxyl group, or a protected oxo group, e.g. a ketalized oxo group, especially an ethylene-dioxy group, an enol ether group, preferably derived from a lower aliphatic alcohol (e.g. an ethyl-enol ether) or an enamine group, such as are obtained for instance with pyrrolidine, piperidine and the like from $\Delta^4$-3-ketone by known methods.

The following examples illustrate the invention:

*Example 1*

In a Claisen distillation flask, of which the side arm is extended to form a short Vigreux column and which is provided with a steel wire stirrer, 15 cc. of diethyl carbonate (purified by 10 minutes stirring with calcium chloride, filtering and distilling) are rapidly heated by dipping in a bath pre-heated to 130° C. Just as boiling commences, with very rapid stirring, 0.37 gram of clean sodium (cut into three strips) is added all at once. As soon as the sodium has reacted (after a few seconds) there is added to the reaction mixture in the course of 15 minutes from a dropping funnel a hot prepared solution of 5 grams of d:1-$\Delta^{5.18}$-3-ethylenedioxy-16-oxo-11$\beta$:18a-oxido-18a-methyl-18-homo-androstadiene of M.P. 14.75–138.5° C. in 15 cc. of absolute dioxane, while at the same time an alcoholic mixture having a boiling range rising from 82° C. to 105° C. escapes from the head of the Vigreux column. In the course of the following 25 minutes a further 10 cc. of diethyl carbonate are added dropwise at a bath temperature of 130–132° C. After distilling off a total quantity of 18 cc., the mixture is cooled in a nitrogen atmosphere and the nitrogen displaced by carbon dioxide dried with blue gel. Stirring in a stream of carbon dioxide is continued at a reduced speed for a further 14 hours. Thereupon the Claisen flask is filled with benzene and the contents poured with stirring into a mixture of 200 cc. of 50% sodium dihydrogen phosphate solution, 150 grams of ice and 300 cc. of benzene, the aqueous layer separated off and this shaken once with benzene. Thereupon the benzene solutions are washed consecutively with water, 2% sodium bicarbonate solution and again twice with water, dried with sodium sulfate several times and evaporated under vacuum and finally under high vacuum. From the crude product weighing 5.5 grams, on the addition of ether, 2.3 grams crystallize of d:1-$\Delta^{5.18}$-3-ethylenedioxy - 16 - oxo-11$\beta$:18a-oxido-18a-methyl-18-homo-etiocholadienic acid ethyl ester of M.P. 155–162° C., which after recrystallization from ether rises to 163° C. The keto ester, which with ferric chloride gives a yellow color, gives no absorption bands in the ultra violet spectrum but in the infra red gives bands at 5.68$\mu$ (ester); 5.79$\mu$ (CO), and 5.95$\mu$ (dihydropyrane).

2.3 grams of this $\beta$-keto ester are dissolved in 12.5 cc. of pyridine and 10 cc. of acetic anhydride whereby after some time crystallization again takes place. After a total period of 2 days the reaction mixture is cooled in an ice-common salt mixture for completion of the crystallization and the crystals are filtered with suction and washed with cold ether. The enol acetate thus obtained in a yield of 1.94 grams melts at 191–200° C. Recrystallization twice from acetone raises the melting point to 197–202° C. Ultra violet spectrum: maximum at 230 m$\mu$ ($\epsilon$=9000). Infra red spectrum: 5.65$\mu$ (enol acetate); 5.85$\mu$ (ester, conj.); 5.96$\mu$ (enol ether); 6.12$\mu$ ($\Delta^{16}$-double bond).

3.42 grams of the enol acetate are hydrogenated up to the absorption of 2 mol equivalents of hydrogen in 400 cc. of ethyl acetate after addition of 2 grams of a 10% palladium-charcoal catalyst and 20 grams of barium carbonate. The catalyst and barium carbonate are filtered off, washed with ethyl acetate and the filtrate evaporated under vacuum. For removal of the remainder of ethyl acetate, the residue is dissolved in benzene and evaporation under vacuum repeated. After the addition of 300 cc. of a 10% methanolic potassium hydroxide solution the whole is boiled under reflux for 2½ hours in a stream of nitrogen and then allowed to stand overnight at room temperature. 31 cc. of glacial acetic acid are then added with cooling with an ice-common salt mixture, followed by evaporation under vacuum to crystallization, dilution with water, saturated common salt solution and 50 cc. of N-hydrochloric acid and extraction twice with benzene and once with ether. With ice water cooling, the combined and dried organic solutions are then treated with ethereal diazo methane until the yellow coloration remains. After 15 minutes excess of diazo methane is destroyed with glacial acetic acid and extraction is carried out once with dilute sodium bicarbonate solution and once with water and the aqueous solutions are again extracted by shaking with fresh ether. The residue (2.96 grams) from the combined, dried and vacuum-evaporated organic solutions is chromatographed on 110 grams of aluminum oxide (activity II). Whereas in the first 130 cc. of a benzene-petroleum ether mixture 1:4 no crystallizing constituents are present, the next 130 cc. of the same mixture, after evaporation and recrystallization of the residue from ether, give 380 mg. of d:1-$\Delta^{18}$-3-ethylenedioxy - 11$\beta$:18a-oxido-18a-methyl-18-homo-androsten-17-carboxylic acid methyl ester of M.P. 170–174° C. Recrystallization from ether-methanol raises the melting point to 170.5–174° C. The infra red spectrum, in addition to the ketal band at 9.1$\mu$, exhibits in the carbonyl region only two bands; 5.73$\mu$ (ester) and 5.96$\mu$ 1(enol ether).

The subsequent benzene-petroleum ether 1:4 eluates (a total of 830 cc.) and the first benzene eluate (200 cc.) contain mixtures of esters saturated and unsaturated in 5:6-position and are combined.

For ketal splitting the combined fractions are treated with 32 cc. of glacial acetic acid and 25 cc. of water and heated for 30 minutes in a stream of nitrogen to 100° C. After evaporation under vacuum, addition of benzene twice with renewed evaporation under vacuum, a solution of the residue (2.2 grams) in 20 cc. of a mixture of benzene-petroleum ether 1:4 is chromatographed on 55 grams of aluminum oxide (activity II). Elution is carried out with benzene-petroleum ether 1:4 mixture and pure benzene. Since the residues from the individual fractions in mixed melting point tests give no depression of the melting point, the fractions containing the $\alpha$:$\beta$-unsaturated ketone must be examined by determining the ultra violet spectrum. In this manner 1 gram is obtained of d:1-$\Delta^{4.18}$- 3 - oxo - 11$\beta$:18a - oxido-18a-methyl-18-homo-etiocholadienic acid methyl ester of M.P. 185–188° C., $\epsilon$248 m$\mu$=16300. For analysis recrystallization from acetone-methanol is carried out several times whereby pure d:1-$\Delta^{4.18}$ - 3 - oxo-11$\beta$:18a-oxido-18a-methyl-18-homo-etiocholadienic acid methyl ester of M.P. 186–192° C. and $\epsilon$239 m$\mu$=17700 is obtained. Infra red spectrum: 5.78$\mu$ (ester); 5.99µ (enol ether +3-CO), and 6.18µ (Δ⁴-double bond).

To a solution of 741 mg. of d:l-Δ$^{4:18}$-3-oxo-11β:18a-oxido-18a-methyl-18-homo-etiocholadienic acid methyl ester in 40 cc. of absolute tetrahydrofurane and 0.48 cc. of pyridine is added with stirring a solution of 550 mg. of osmium tetroxide in 24 cc. of absolute ether. The whole is then allowed to stand overnight at room temperature, treated on the following day with 220 cc. of methanol and with stirring a solution of 7.5 grams of ammonium sulfite in 220 cc. of water allowed to flow in. After 75 minutes' stirring, addition of Celite, filtration through a thin layer of Celite and washing with 400 cc. of methanol, the filtrate is evaporated in a water pump vacuum and at a bath temperature of 50–60° C. to a small volume. Dilution is then carried out with 150 cc. of semi-saturated common salt solution followed by extraction by shaking four times with 125 cc. of a mixture consisting of 7 parts by volume of chloroform and 3 parts by volume of alcohol. The residue from the organic solutions which have been washed with 150 cc. of semi-saturated common salt solution, dried and evaporated under vacuum, gives on addition of methanol 447 mg. of crystals of M.P. 217–225° C. which in the ultra violet spectrum show practically no absorption.

A solution of the residue from the evaporated mother liquor (340 mg.) in 5 cc. of dioxane, 1 cc. of methanol and 1 cc. of pyridine is treated with stirring with 1 cc. of an 0.88-molar periodic acid solution. After stirring for 1½ hours at room temperature, adding 75 cc. of semi-saturated common salt solution and extracting by shaking four times with 40 cc. of a chloroform-alcohol 7:3 mixture, the organic solutions are washed once with 75 cc. of semi-saturated common salt solution, dried and evaporated under vacuum. The residue (370 mg.) is dissolved in 10 cc. of glacial acetic acid and treated within 3 hours 5 times with 64 mg. of chromium trioxide in 4 cc. of glacial acetic acid and finally with 32 mg. of chromium trioxide in 2 cc. of glacial acetic acid. Since after a total period of 5 hours excess of oxidising agent is still present, treatment is carried out with a solution of 400 mg. of sodium sulfite in a little water followed by evaporation under vacuum to a small volume. After addition of dilute caustic soda solution to an alkaline reaction, extraction twice by shaking with chloroform and washing the chloroform extracts twice with 50 cc. of N-sodium hydroxide solution and then with semi-saturated common salt solution, the aqueous solutions are combined and acidified with hydrochloric acid to pH 4. This is followed by extraction 3 times with 75 cc. of chloroform and the combined and dried chloroform solutions are evaporated under vacuum. For hydrolysis, a solution of the residue (200 mg.) in 10 cc. of 10% methanolic potassium hydroxide solution in an evacuated ampoule, is placed for 4 hours in a boiling methanol bath and then allowed to stand for a further 10½ hours at room temperature. After treatment with 50 cc. of saturated common salt solution, 25 cc. of water and 2 cc. of glacial acetic acid, extraction by shaking once with 60 cc. of chloroform and 3 times with 50 cc. of a chloroform-alcohol mixture (17:3) the combined and dried organic extracts are evaporated under vacuum as a result of which 170 mg. of a foam remain. This is dissolved in methanol-ether and treated with excess of ethereal diazo methane with ice cooling and 10 minutes later glacial acetic acid added and the whole evaporated under vacuum. By chromatography of the residue on 6 grams of aluminum oxide (activity II) the (18→11)-lactone of d:l-Δ⁴-3-oxo-11β-hydroxy-etiocholenic acid methyl ester-18-acid is eluted with benzene and after recrystallization from acetone-ether melts at 241–243° C., ε 239 mµ=16,200. The infra red spectrum shows in the carbonyl region the following characteristic bands: 5.64µ (γ-lactone); 5.76µ (ester), and 5.98µ and 6.18µ (Δ⁴-3-CO).

The same lactone-etiocholenic acid methyl ester of M.P. 241–243° C. is obtained when the (18→11)-lactone of d:l - Δ⁵ - 3-ethylene-dioxy-11β-hydroxy-16-oxo-androstene-18-acid is condensed as in the above example with dimethyl carbonate, then the 16-enol acetate prepared with pyridine and acetic anhydride and by hydrogenation, as above described, the 16-acetoxy group and 16:17-double bond removed.

*Example 2*

To a mixture of 10 cc. of diethyl carbonate, 1 gram of sodium hydride and 0.4 cc. of absolute alcohol there is added at room temperature a solution of 2 grams of d:l-Δ$^{5:14:18}$ - 3 - ethylene - dioxy-11β:18a-oxido-16-oxo-18a-methyl-18-homo-androstatriene in 6 cc. of absolute dioxane. After 18 hours' stirring, the unconsumed sodium hydride is decomposed by addition of 8 cc. of absolute alcohol and 5 cc. of glacial acetic acid are added with cooling. By extraction by shaking with a benzene-ethyl acetate mixture, washing the organic layer consecutively with potassium dihydrogen phosphate solution, sodium bicarbonate solution and water, drying and evaporation under vacuum, by crystallization of the residue from ether 1.32 grams of d:l-Δ$^{5:14:18}$-3-ethylene-dioxy-11β:18a-oxido - 16 - oxo-17-carbethoxy-18a-methyl-18-homo-androstatriene are obtained. After recrystallization from methylene chloride-ether, the keto ester melts at 154–156° C. When mixed with the starting material it shows a melting point depression of about 23° C. Ultra violet spectrum: maximum at 233mµ (ε=18,500).

2.83 grams of this keto ester, dissolved in 100 cc. of absolute alcohol with the addition of 10 cc. of triethylamine, are shaken in a hydrogen atmosphere in the presence of 2 grams of palladium carbon catalyst (10% Pd). The hydrogenation comes to a standstill after the absorption of one equivalent of hydrogen. After filtering off from the catalyst, concentration of the solution under vacuum, dissolving the concentrate in methylene chloride, washing the solution produced with potassium dihydrogen phosphate, drying with sodium sulfate and evaporation of the methylene chloride, the last operation with the addition of ether, d:l-Δ$^{5:18}$-3-ethylene-dioxy - 11β:18a - oxido - 16 - oxo - 17 - carbethoxy - 18a-methyl-14-iso-18-homo-androstadiene is obtained in colorless crystals of M.P. 146–148° C., which show no further absorption maximum in the ultra violet spectrum.

2 grams of this compound, as a dry crystal powder, are added with stirring to a solution cooled to room temperature of 12.5 cc. of pyridine and 10.0 cc. of acetic anhydride and stirring continued until solution is effected, followed by standing for 48 hours. For the production of the enol acetate a further 10 cc. of pyridine are added and the reaction solution which has been diluted with benzene is stirred for 45 minutes with 50 cc. of ice water. From the benzene solution washed several times with water, after concentration and on addition of ether, d:l-Δ$^{5:16:18}$-3-ethylene-dioxy-11β:18a-oxido - 16 - acetoxy-17-carbethoxy-18a-methyl-14-iso-18-homo - androstatriene crystallizes in weakly yellowish crystals which after recrystallization from ether melt at 162–163° C.

To 1.47 grams of palladium-charcoal catalyst (10% Pd), 9 grams of pure calcium carbonate and 50 cc. of ethyl acetate, after prehydrogenation, 1.47 grams of the above enol acetate are added and the whole is shaken in a hydrogen atmosphere. Within 50 minutes the hydrogenation is complete. The solution filtered from catalyst and calcium carbonate, after dilution with ether, is washed with dilute sodium bicarbonate solution and then with water, dried over sodium sulfate and concentrated under vacuum. After recrystallization from alcohol, the resulting d:l-Δ$^{5:18}$-3-ethylene-dioxy-11β:18a-oxido - 18a-methyl-14-iso-18-homo-etiocholadienic acid ethyl ester melts at 127–139° C.

0.8 gram of this ester is hydrolyzed by boiling for 3 hours in 25 cc. of 10% methanolic caustic potash solution in a nitrogen atmosphere. After dilution with ice water, the whole is rendered acid with 50 cc. of 50% sodium dihydrogen phosphate solution and extracted with benzene. From the residue of the dried and concentrated benzene solution, on the addition of ether, the free etiocholadienic acid (M.P. 223° C.) crystallizes. 50 mg. of this acid, as a suspension in 2 cc. of methanol and 1 cc. of ether, is treated with 2.5 cc. of an ethereal diazomethane solution. The solid substance passes into solution within 5 minutes with evolution of nitrogen. After a further 5 minutes the solution is concentrated under vacuum. The d:l-$\Delta^{5:18}$-3-ethylene-dioxy-11$\beta$:18a-oxido-18a-methyl-14-iso-18-homo - 17$\alpha$ - etiocholadienic acid methyl ester which crystallizes from the residue on addition of ether, after recrystallization from heptane melts at 144–144.5° C.

To a solution of 259 mg. of the $\Delta^4$-3-keto-etio-ester (obtained from the above ester by ketal splitting as described in Example 1) in 15 cc. of tetrahydrofurane which has been distilled over lithium-aluminum hydride, and 1.55 cc. of pyridine is added a solution of 265 mg. of osmium tetroxide in 20 cc. of absolute ether, the whole is stirred for 1½ hours and then allowed to stand overnight at room temperature. Dilution is then carried out with 75 cc. of methanol, followed by treatment with 75 cc. of 4% ammonium sulfite solution and stirring is carried out for 75 minutes at room temperature. Then Celite is added and the whole is filtered through Celite, which is then washed with methanol, and the combined filtrate is evaporated at 50° C. under vacuum to about 100 cc. After addition of 75 cc. of semi-saturated common salt solution and extracting by shaking four times with 40 cc. each time of a chloroform-alcohol 7:3 mixture, the organic solutions are separately washed with 75 cc. of semi-saturated common salt solution, dried and evaporated under vacuum. The residue is dissolved in 6 cc. of methanol and 0.925 cc. of pyridine and the solution treated, with stirring, with 1.24 cc. of an 0.812-molar periodic acid solution. 1½ hours later 75 cc. of semi-saturated common salt solution are added and working up is carried out as above described. A solution of the reaction product in 1 cc. of benzene is chromatographed on 7 grams of aluminum oxide (activity II). After recrystallization of the crystalline benzene eluates from ether, 122 mg. are obtained of d:l-$\Delta^4$-3:18-dioxo-11$\beta$-acetoxy-14-iso-17$\alpha$-etienic acid methyl ester having the following characteristic bands in the infra red spectrum (solvent methylene chloride): 5.78$\mu$ (ester+aldehyde+acetate) and 5.99$\mu$, 6.18$\mu$ ($\Delta^4$-3-ketone).

67 mg. of the resulting acetoxy-aldehyde are dissolved in 5 cc. of glacial acetic acid and treated at intervals of 1 hour each on two occasions with 0.5 cc. and on one occasion with 0.25 cc. of a 1.6% solution of chromium trioxide in glacial acetic acid. After a total of 3 hours 20 mg. of sodium bisulfite are added and the whole is poured into 55 cc. of 2 N-sodium carbonate solution and 10 cc. of N-sodium hydroxide solution and extracted twice with 30 cc. of chloroform. The chloroform solutions are extracted by shaking once with 50 cc. of 0.2 N-sodium hydroxide solution containing 3 grams of common salt, whereupon the two aqueous-alkaline solutions are combined, acidified with 2 N-hydrochloric acid, saturated with common salt and extracted several times with chloroform. The residue from the dried and evaporated chloroform extracts, together with 5 cc. of 10% methanolic caustic potash solution, is placed in an evacuated ampoule and kept for 4 hours in a boiling methanol bath.

The whole is then allowed to stand for a further 12 hours at room temperature and then poured into 40 cc. of dilute common salt solution and 1 cc. of glacial acetic acid. After extraction by shaking once with 30 cc. of chloroform and 3 times with 30 cc. each time of a chloroform-alcohol 17:3 mixture, the organic solutions are combined, dried and evaporated under vacuum. To an ice cooled solution of the residue in 2 cc. of chloroform ethereal diazomethane is added and the whole is allowed to stand for 10 minutes at 0° C. Then excess of diazomethane is destroyed with glacial acetic acid and the whole is evaporated under vacuum and chromatographed on 1.2 grams of aluminum oxide (activity II). In the fractions eluted with benzene-petroleum ether 1:2 and 1:1 mixture is found the (18→11)-lactone of the d:l-$\Delta^4$-3-oxo-11$\beta$-hydroxy-14-iso-17$\alpha$-etiocholanic acid ester-18-acid of M.P. 228–230° C. after recrystallization from acetone-ether. $\epsilon 238 m\mu = 17400$. Infra red spectrum in methylene chloride: 5.6$\mu$, $\gamma$-lactone; 5.74$\mu$, ester, and 5.96$\mu$+6.16$\mu$, $\Delta^4$-3-ketone.

The same compound is also obtained by periodic acid oxidation of d:l-$\Delta^4$-3:20-dioxo-11$\beta$:21-dihydroxy-14-iso-17$\alpha$-pregnene - 18 - acid-lactone-(18→11) and subsequent esterification with diazomethane.

To a solution of 430 mg. of d:l-$\Delta^{4:18}$-3-oxo-11$\beta$:18a-oxido-18a-methyl-18-homo-14-iso-17$\alpha$-etiocholadienic acid methyl ester in 5 cc. of methylene chloride and 5 cc. of 80% acetic acid there is added with stirring and ice cooling a solution of 320 mg. of chromium trioxide in 3.2 cc. of 80% glacial acetic acid. After standing overnight at 0–5° C. and reduction of the excess chromium trioxide with sodium sulfite, the whole is poured into dilute common salt solution and extracted twice with benzene and once with ether. Thereupon the organic solutions are extracted by shaking 3 times with 50 cc. of N-caustic soda solution and with water, dried and evaporated under vacuum. By chromatography of the residue on aluminum oxide there is obtained therefrom the d:l-$\Delta^4$-3:11-dioxo - 18 - acetyl-14-iso-17$\alpha$-etiocholenic acid methyl ester of M.P. 175–180° C. Infrared spectrum in methylene chloride: characteristic bands at 5.77$\mu$, ester; 5.84$\mu$, methyl ketone+11-CO, and 5.96$\mu$+6.16$\mu$, $\Delta^4$-3-ketone. The aqueous-alkaline extracts above obtained are acidified with glacial acetic acid, saturated with common salt and extracted by shaking several times with chloroform. The residue of the dried and evaporated chloroform extracts is heated for 4½ hours with 5 cc. of 10% methanolic caustic potash solution is an evacuated ampoule in a boiling methanol bath and the whole is then left to stand for 14 hours at room temperature. Working up as above described gives the (18→11)-lactone of the d:l-$\Delta^4$-3-oxo-11$\beta$-hydroxy-14-iso-17$\alpha$-etiocholenic acid methyl ester-18-acid.

What is claimed is:

1. Process for the synthesis of steroids having in 17-position a member selected from the group consisting of a free and an esterified carboxyl group, wherein a compound of the formula

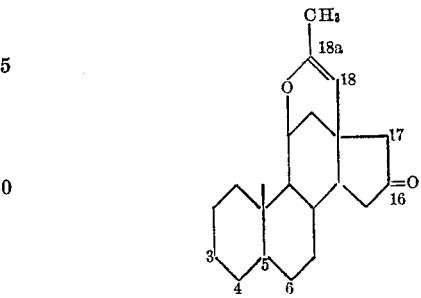

containing in 3-position a protected oxo group, and a double bond extending from position 5 to position 6 is condensed with a carbonic acid alkyl ester in the presence of a strongly alkaline condensing reagent, converting the resulting compounds into a 16-enol ester by treatment with a member of the group consisting of acid anhydrides and acid halides, and removing the 16-enol ester, together with the 16,17-double bond, by hydrogenating the 16-enol ester in the presence of a metal catalyst in a neutral to weakly alkaline medium.

2. Process as claimed in claim 1, wherein the compound of the formula

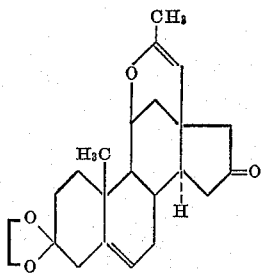

is used as starting material.

3. Process as claimed in claim 1, wherein in the enol acetate of the formula

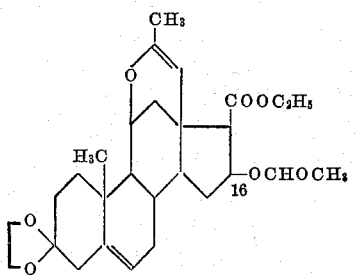

the enol group and the 16:17-double bond are removed by treatment with hydrogen in the presence of a palladium catalyst.

4. The compound of the formula

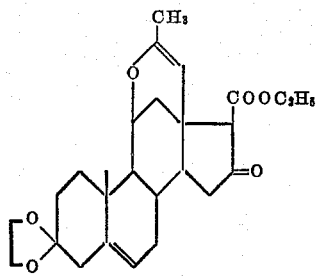

5. The compound of the formula

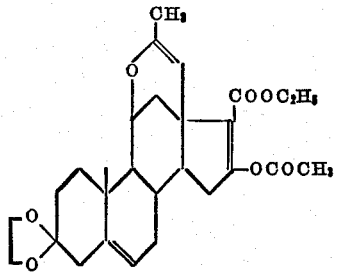

6. The compound of the formula

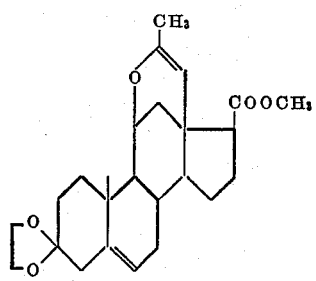

7. The compound of the formula

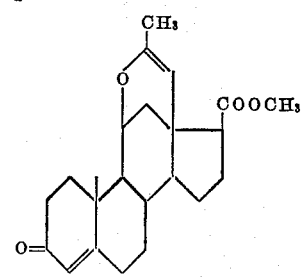

8. A member selected from the group consisting of a compound of the formula:

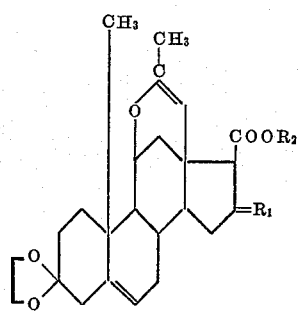

wherein $R_1$ represents a member selected from the group consisting of two hydrogen atoms, an oxo group, an enol group thereof esterified by a lower alkanoic acid, an enol group thereof esterified by benzoic acid and an enol group thereof esterified by methane sulfonic acid and $R_2$ represents a member selected from the group consisting of hydrogen and a lower alkyl group.

9. A member selected from the group consisting of a compound of the formula:

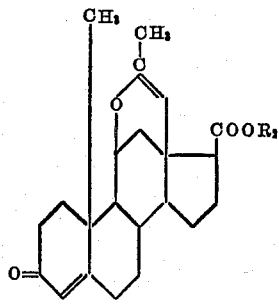

wherein $R_2$ represents a member selected from the group consisting of hydrogen and a lower alkyl group.

No references cited.

UNITED STATES PATENT OFFICE
CERTIFICATE OF CORRECTION

Patent No. 2,957,868                      October 25, 1960

Albert Wettstein et al.

It is hereby certified that error appears in the above numbered patent requiring correction and that the said Letters Patent should read as corrected below.

Column 1, line 57, for "hydrogenalytically" read -- hydrogenolytically --; column 3, lines 46 and 47, for "M.P. 14.75-138.5° C." read -- M.P. 147.5-148.5° C. --; column 4, line 49, for "5.73" read -- 5.78 --; same line 49, for "1(enol" read -- (enol --; line 70, for "248" read -- 239 --; column 8, line 9; for "acid ester-" read -- acid methyl ester- --; line 41, for "solution is" read -- solution in --.

Signed and sealed this 14th day of November 1961.

(SEAL)
Attest:

ERNEST W. SWIDER                                                DAVID L. LADD
Attesting Officer                                              Commissioner of Patents

USCOMM-DC